G. W. WALLICK.
WHEEL FOR TRACTORS.
APPLICATION FILED JUNE 8, 1916.
1,251,850.
Patented Jan. 1, 1918.
2 SHEETS—SHEET 1.
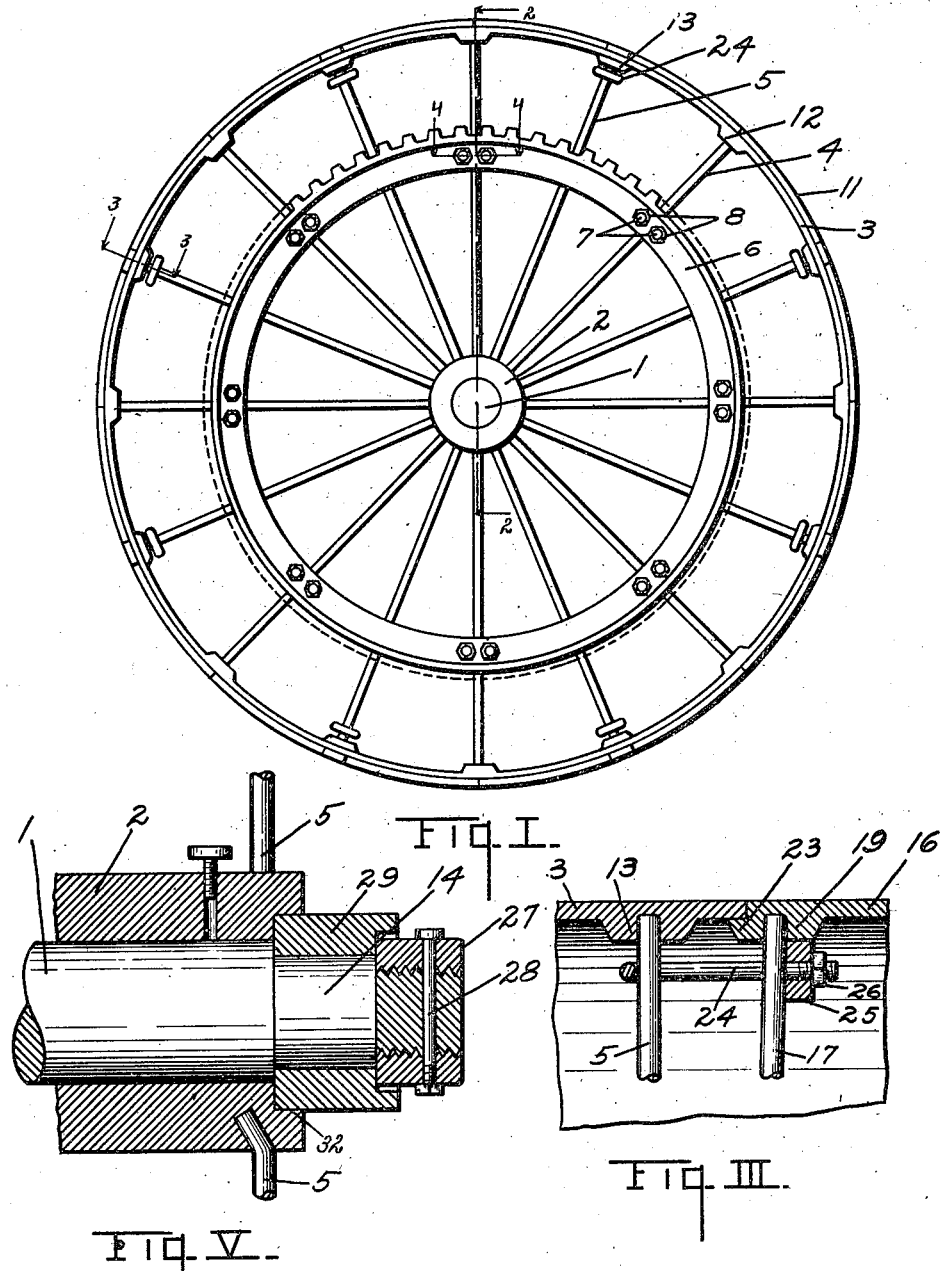
WITNESSES:
Luther Blake
Morris Stimson
INVENTOR.
George W. Wallick
BY Chappell & Earl
ATTORNEYS.

G. W. WALLICK.
WHEEL FOR TRACTORS.
APPLICATION FILED JUNE 8, 1916.
1,251,850.
Patented Jan. 1, 1918
2 SHEETS—SHEET 2.
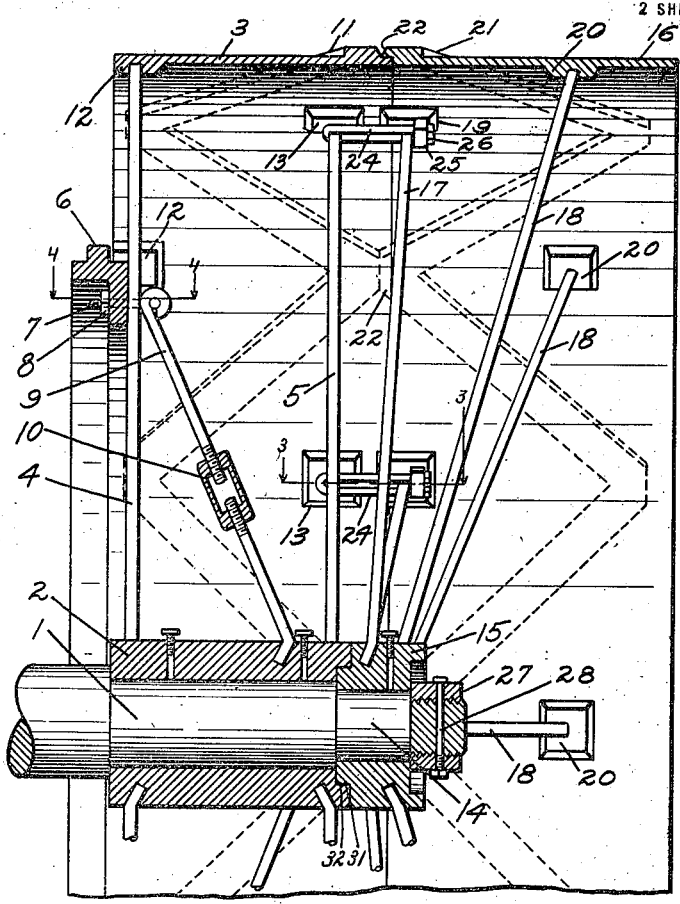
Fig. II.
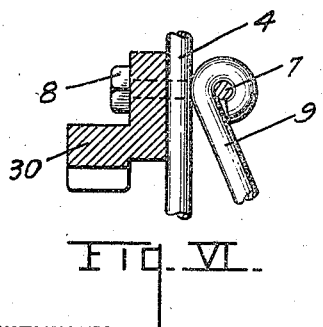
Fig. VI.
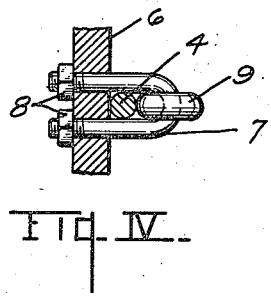
Fig. IV.
WITNESSES:
Luther Blake
Morris Stimson
INVENTOR.
George W. Wallick
BY Chappell & Earl
ATTORNEYS.

UNITED STATES PATENT OFFICE.

GEORGE W. WALLICK, OF STURGIS, MICHIGAN.

WHEEL FOR TRACTORS.

1,251,850.     Specification of Letters Patent.     Patented Jan. 1, 1918.

Application filed June 8, 1916. Serial No. 102,522.

*To all whom it may concern:*

Be it known that I, GEORGE W. WALLICK, a citizen of the United States, residing at Sturgis, county of St. Joseph, State of Michigan, have invented certain new and useful Improvements in Wheels for Tractors and the like, of which the following is a specification.

This invention relates to improvements in wheels for tractors and the like.

The main objects of this invention are:

First, to provide an improved wheel adapted as a traction wheel for traction engines or tractors and the like which may be extended or made wider for use on soft ground, the detachable or auxiliary part being readily removed or attached, the parts when assembled being, in effect, a unitary wheel.

Second, to provide an improved wheel having these advantages which is simple and at the same time strong and rigid.

Further objects, and objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side elevation of my improved wheel adapted as a traction wheel and provided with an external gear or sprocket.

Fig. II is an enlarged detail vertical section, showing the disposition of the various parts and the means for securing the wheel members together, taken on line 2—2 of Fig. I.

Fig. III is an enlarged detail transverse section through the rims of the two wheel members, showing the joining of the same and the means for securing them together, taken on line 3—3 of Figs. I and II.

Fig. IV is an enlarged detail horizontal section, showing the means for connecting the external driving gear to the spokes of the main wheel member, taken on line 4—4 of Figs. I and II.

Fig. V is an enlarged detail vertical section through the hub and axle of the main wheel member, showing the sleeve for replacing the hub of the auxiliary wheel member when the latter is not in use.

Fig. VI is an enlarged detail vertical section through a portion of the main wheel member, showing an internal driving gear secured to the spokes of the same.

In the drawing, similar reference characters refer to similar parts throughout the several views, and the sectional views are taken looking in the direction of the little arrows at the ends of the section lines.

Referring to the numbered parts of the drawing, 1 represents the spindle of an axle having a reduced portion 14 at its outer end. I provide a main wheel member comprising a hub 2 fitting the larger portion of the spindle, a rim 3, and sets of spokes 4 and 5. The structure illustrated is designed as a traction wheel and is provided with an external gear or sprocket 6. This gear is secured to the inner set of spokes 4 by means of the U-bolts or clips 7 embracing the spokes 4 and projecting through an inwardly projecting flange on the gear and provided with nuts 8. A set of brace rods 9 extends from the hub to these clips 7, the brace rods being provided with turn buckles 10. The rim 3 is provided with zigzag tread lugs 11.

I preferably provide the rim with bosses 12 and 13 for the sets of spokes 4 and 5, respectively.

I provide an auxiliary wheel member comprising the hub 15 fitting the reduced portion of the spindle, the rim 16 and sets of spokes 17 and 18. The rim is provided with bosses 19 and 20 for the sets of spokes 17 and 18. The rims 3 and 16 lie edge to edge and the bosses 19 are extended to form lugs 23 which lap the inner side of the rim 3. The rim 16 is provided with tread lugs 21 disposed in a zig zag relation, the inner ends of the tread lugs being extended to provide lugs 22 overlapping the rim 3. These extensions meet or abut the ends of the tread lugs 11 of the rim 3. The members are clamped together by the clips 24 which embrace adjacent spokes 5 and 17 of the members. These clips are in the form of U-bolts and are provided with cross pieces 25 arranged on the ends of the bolts and retained by the nuts 26.

The hubs are retained by the nut 27 and I preferably provide a locking pin 28 therefor.

When the auxiliary wheel member is removed a sleeve 29 is substituted, thus properly supporting the hub of the main wheel member. The hub of the auxiliary member is preferably shouldered at 31, the hub of the inner member being recessed at 32 to receive the same. The sleeve 29 fits into this recess (see Fig. V).

In Fig. VI I show an internal gear 30, the same being mounted on the spokes as described for the external gear 6.

With the parts thus arranged, the structure may be readily made into the wide tread or the narrow tread, as desired, the changes being quickly made. When the members are assembled the structure is very secure and is practically a unitary wheel.

Having thus described my invention, what I claim as new and desire to secure by Letters Patent, is:

1. In a structure of the class described, the combination of an axle provided with a spindle, of a pair of wheel members each comprising a hub, a rim and spokes, the rims of said members being disposed edge to edge, a sleeve adapted to be substituted for the hub of the outer member when the outer member is removed and fitting against said inner member hub, and means for detachably securing said members together.

2. In a structure of the class described, the combination of an axle provided with a spindle, a main member, and a detachable auxiliary member, each comprising a hub, a rim and spokes, the rims of said members being disposed edge to edge, spoke bosses on the auxiliary member rim extended to provide lugs lapping the inner side of the main member rim, tread lugs for said rims disposed in zig zag relation thereon, the inner ends of the tread lugs of the auxiliary member rim being extended to overlap the outer edge of the main member rim and meeting the inner ends of the tread lugs thereof, and clips uniting adjacent spokes of said main and auxiliary members.

3. In a structure of the class described, the combination with an axle, of a main wheel member and a detachable auxiliary wheel member, each comprising a hub, a rim and spokes, the rims being disposed edge to edge, lugs on the rim of said auxiliary member overlapping the inner and outer sides of the rim of said main member, the rims of said members being provided with tread lugs disposed in a zig zag relation with their adjacent ends meeting, the inner ends of the tread lugs of said auxiliary member rim constituting the outer rim engaging lugs thereof, and means for clamping said rims together.

4. In a structure of the class described, the combination with an axle, of a main wheel member and a detachable auxiliary wheel member, each comprising a hub, a rim and spokes, the rims being disposed edge to edge, the rim of the auxiliary member being provided with projecting lugs engaging the inner and outer sides of the rim of the main wheel member, and means for securing the members together engaging spokes thereof.

In witness whereof, I have hereunto set my hand and seal in the presence of two witnesses.

GEORGE W. WALLICK. [L. S.]

Witnesses:
WILLIAM W. WALLICK,
C. B. SWIHART.